United States Patent
Launay et al.

(10) Patent No.: US 8,561,291 B2
(45) Date of Patent: Oct. 22, 2013

(54) METHOD FOR PRODUCING A NUMBER OF CHIP CARDS

(75) Inventors: Francois Launay, Epron (FR); Guy Enouf, Saint-Sylvain (FR)

(73) Assignee: Oberthur Technologies, Colombes (FR)

( * ) Notice: Subject to any disclaimer, the term of this patent is extended or adjusted under 35 U.S.C. 154(b) by 586 days.

(21) Appl. No.: 12/091,904

(22) PCT Filed: Oct. 25, 2006

(86) PCT No.: PCT/FR2006/002399
§ 371 (c)(1),
(2), (4) Date: Apr. 28, 2008

(87) PCT Pub. No.: WO2007/048927
PCT Pub. Date: May 3, 2007

(65) Prior Publication Data
US 2008/0276456 A1    Nov. 13, 2008

(30) Foreign Application Priority Data

Oct. 28, 2005 (FR) ..................................... 05 11078

(51) Int. Cl.
*H05K 3/30* (2006.01)

(52) U.S. Cl.
USPC ............... 29/832; 29/417; 29/827; 29/846; 29/856; 235/488; 235/492; 257/679; 257/698; 257/702; 257/711; 361/719; 361/784

(58) Field of Classification Search
USPC ........ 29/417, 592.1, 600, 827, 832, 840, 846, 29/856, 876; 235/488, 492; 257/679, 698, 257/702, 711; 361/719–721, 784
See application file for complete search history.

(56) References Cited

U.S. PATENT DOCUMENTS

| | | | |
|---|---|---|---|
| 4,829,666 A * | 5/1989 | Haghiri-Tehrani et al. ..... | 29/841 |
| 5,023,751 A * | 6/1991 | Stampfli ....................... | 361/751 |
| 5,745,988 A | 5/1998 | Hohmann et al. | |
| 6,233,818 B1 | 5/2001 | Finn et al. | |
| 2003/0008118 A1 | 1/2003 | Smulson | |
| 2006/0030080 A1 * | 2/2006 | Hsueh et al. .................. | 438/126 |

FOREIGN PATENT DOCUMENTS

| DE | 10248392 A1 * | 5/2004 |
|---|---|---|
| EP | 0689164 | 12/1995 |
| WO | 03017743 | 2/2003 |

OTHER PUBLICATIONS

International Search Report for PCT/FR2006/002399 dated Mar. 15, 2007.

* cited by examiner

*Primary Examiner* — Paul D Kim
(74) *Attorney, Agent, or Firm* — Young & Thompson

(57) ABSTRACT

A method for producing a number of chip cards includes a step for preparing a supporting film comprising a number of locations each of which constituting a card support and being provided with a cavity capable of receiving an integrated circuit, a step for processing this supporting film carried out, in part, by a multi-head tool, one of the heads of this tool being provided for carrying out an operation on a location of the film essentially at the same time as another head of this tool carries out the same operation on another location of this film, and a step for separating the locations after the processing step.

14 Claims, 6 Drawing Sheets

Figure 5:
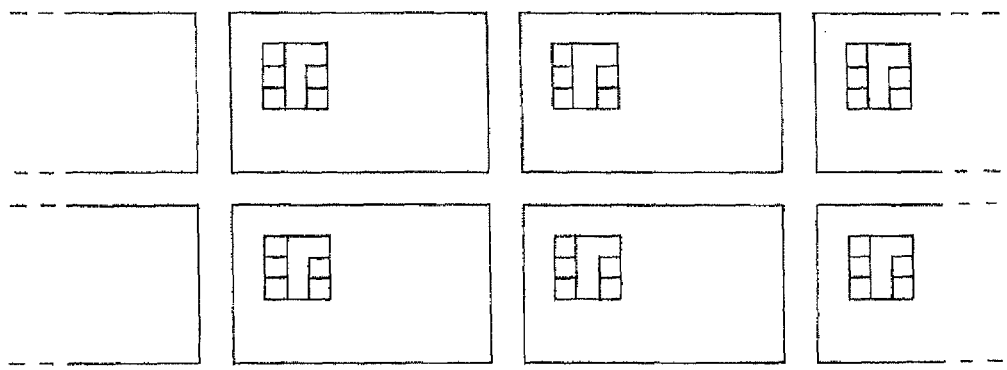

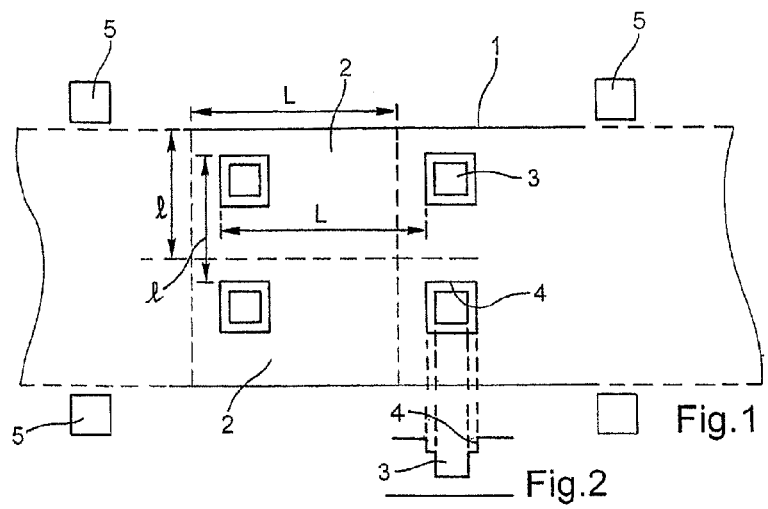
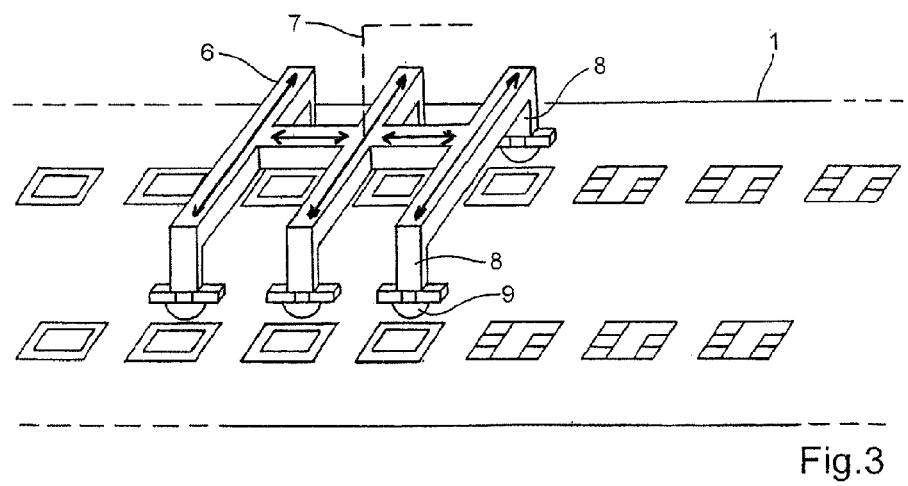
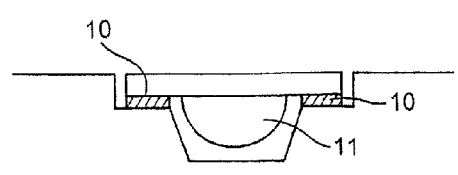

METHOD FOR PRODUCING A NUMBER OF CHIP CARDS

The invention concerns a method for producing a number of chip cards.

These can be memory cards, for example, such as those known as "SD cards", or cards known as "smart media" cards. It is preferably, although not necessarily, a question of a card conforming to the ISO 7816 standard.

Various chip card formats exist, including:
- the ID-1 format of the ISO 7810 standard, used for bank cards, for example, sometimes referred to as "large format" cards because of the dimensions of the other formats,
- the ID-000 format widely used as identification cards for subscribers of mobile telephone operators, commonly referred to as a "plug-in SIM" card (SIM standing for Subscriber Identification Module),
- the Mini-UICC format, that most recently introduced and intended, in a certain number of applications, to be substituted for the ID-000 format.

Other known formats include "multimedia", SD SIM (SD standing for Secure Digital), mini-VISA, etc.

In fact, the field of application of such chip cards never ceases to widen and covers managing and transporting data, debit-credit, mobile telephony, identification and access control, including communication with the outside environment that can be of highly diverse types (via electrical contacts in the case of "contact" cards, a radio-frequency connection in the case of "contactless" cards or "dual" or hybrid cards (with both electrical contacts and an antenna), thermal and other sensors, etc.).

Fabrication techniques for such cards are well known in the art and conventionally include:
1—preparation of at least two large films (intended to form a number of cards, typically 48 cards in a 6×8 array); there are generally more than two films, for example when using a central inlay provided with an antenna for the fabrication of dual or contactless cards,
2—printing of one face of each of the films,
3—hot lamination of the two films (and any intermediary films) to form a support film having substantially the final thickness,
4—cutting up this support film to form a number of (typically 48) individual card supports (or bodies),
5—creation of a cavity in each of the individual card supports,
6—insertion and fixing of a microcircuit in the cavity (where applicable mounted in a module),
7—physical personalization of the individual card support (typically by embossing, laser engraving, inkjet printing of information linked to the cardholder), and
8—personalization of the microcircuit.

In practice the steps 5 to 8 are carried out individually, card by card. With regard to the step 8, there are machines capable of personalizing cards in batches, for example batches of cards engaged in slots of a drum, but in these batches personalization is effected successively on the cards of the batch in the process of being personalized.

Diverse variants have been envisaged. Thus the document DE-195 02 468 describes a method of fabricating an array of individual card supports involving injection molding of the individual card supports (incorporating their cavity) and small bridges of material interconnecting them. The document FR-2 622 323 likewise describes a set of card supports produced, with their respective cavities, by injection molding, printing the surface of the large film obtained in this way, and then cutting that large film into a plurality of card supports.

The document FR-2 778 002 teaches the production of a "small" card within a "large" format card, so as to fabricate small cards using fabrication techniques proven for the fabrication of "large" cards. The document FR-2 795 847 teaches the successive production of a number of elements (called inserts) in the same large card support.

In other words, it is standard practice to fabricate small format cards, i.e. cards with a format smaller than that of ID-1 cards, via the ID-1 format.

Diverse techniques are known in the art for assembling microcircuits into the cavities of their card supports (an operation often referred to as embedding), including in particular:
- transfer molding a resin around the electronic module including the microcircuit; this technology is similar to molding electronic component packages,
- assembly of two plastic shells around the electronic module,
- fixing the electronic module (usually by a gluing process).

All these techniques have the drawback of proceeding individually to the embedding and electrical testing after embedding operations, which leads to fabrication throughputs that can prove insufficient given current requirements.

The invention consists in a method for fabrication of chip cards that increases the fabrication throughput, in particular in the case of small format cards, without involving machinery of unacceptable volume or excessive cost.

To this end the invention proposes a method for producing a plurality of chip cards including a step of preparation of a support film including a plurality of locations each of which is intended to constitute a card support and is provided with a cavity adapted to receive a microcircuit, a step of processing said support film carried out at least in part by means of a multiple head tool, at least one of the heads of this tool being adapted to effect an operation on one location of the film substantially at the same time as another head of that tool is effecting the same operation on another location of the film, and a step of separating the locations after this processing step.

It has become apparent that the drawback of small cards compared to larger format cards, which resides in particular in the complexity of the operations for indexing and positioning the individual card supports necessary for the proper execution of the individual embedding operations, could be avoided by carrying out the embedding on the support films, and thus before complete separation of the individual supports, benefiting from the fact that, precisely because of the small size of the cards to be fabricated, it is possible to use multiple-head tools of moderate volume (in machines also of moderate volume), and that it is therefore realistic to process simultaneously a plurality of individual card supports. In other words, the invention resides in particular in realizing that the small size of the small cards, until now perceived above all as a drawback of their fabrication, also has countervailing advantages.

Clearly, even if the invention is particularly advantageous for the production of small cards (the use whereof is becoming generalized), it can equally be applied to the fabrication of ID-1 or similar cards. Accepting carrying out the embedding operations before complete separation (and thus accepting that the separation operations are sufficiently reliable for there to be no risk of degrading the cards fitted with their microcircuits (in modules or in isolation)) simplifies the indexing and positioning operations regardless of the size of the cards, given that it is not necessary to provide spacers or other equivalent parts between the card supports, which can therefore be very close together during embedding (or electrical testing) operations. It is clear from the above comments that the invention can be applied not only to the simultaneous fabrication of identical cards but also to that of cards of different sizes.

Using multiple-head tools increases fabrication throughput, while their use on the support film retains a moderate volume for these tools and for the machine of which the tools form part. Finally, the fact that indexing and positioning apply to the support film and not to the cards with the final format contributes to minimizing costs since the indexing and positioning systems depend only on the dimensions of the support sheet (in practice each manufacturer adopts a very small number of values for these dimensions), independently of the dimensions of the finished cards.

According to advantageous features of the invention, where appropriate combined:

the support film preparation step includes an operation of injection molding the film with said cavities;

the preparation step includes an operation of forming slots between the locations leaving mechanical connection bridges to facilitate the subsequent separation operation;

the preparation step includes an operation of forming scorelines in the thickness of the film to facilitate the subsequent separation operation;

the operation intended to facilitate the subsequent separation operation is carried out when molding the support;

the processing step carried out at least in part by means of a multiple-head tool is an embedding step;

the multiple-head tool is used for an operation of simultaneously placing electronic modules including a microcircuit in a plurality of cavities of the support film;

the sheet preparation step includes an operation of formation of lips at the periphery of the cavities;

the lip formation operation takes place during a step of preparation of the support film by molding;

the multiple-head tool is used for an operation of forming tracks and contacts in the cavity by stamping;

the operation of forming tracks and contacts by stamping is effected by means of stamping heads acting on conductive material strips disposed temporarily over a series of at least two cavities;

the multiple-head tool is used for an operation of placing microcircuits in a plurality of cavities;

the support film preparation operation includes an operation of forming inclined flanks around the bottom of the cavities;

the operation of forming the flanks is part of an operation of preparing the support film by molding;

the multiple-head tool is used for an operation of depositing a dose of resin in each of the cavities;

the multiple-head tool is used for an operation of electrical testing of the microcircuits after placing and fixing in the cavities;

the multiple-head tool is used for an operation of personalizing the cards;

the multiple-head tool includes a plurality of laser printing heads;

the multiple-head tool includes a plurality of inkjet printing heads;

the multiple-head tool includes a plurality of punching heads;

all the heads of the tool effect the same operation at the same time;

the heads of the multiple-head tool have variable gaps between them corresponding to different card formats.

The invention concerns a chip card fabrication method and a chip card fabrication machine.

The invention therefore proposes, for implementing the aforementioned method, a machine for fabrication of chip cards including working areas at least one of which is provided with a multiple-head tool adapted to effect the same operation at several locations of a support film provided with cavities and intended to form future chip cards.

According to advantageous features of the machine, where appropriate combined:

the multiple-head tool is adapted to carry out at least part of an embedding step;

the multiple-head tool is used for an operation of simultaneously placing electronic modules including a microcircuit in a plurality of cavities of the support film;

the multiple-head tool is used for an operation of forming tracks and contacts in the cavity by stamping;

the multiple-head tool is used for an operation of placing microcircuits in a plurality of cavities;

the multiple-head tool is used for an operation of depositing a dose of resin in each of the cavities;

the multiple-head tool is used for an operation of electrical testing of the microcircuits after placing and fixing in the cavities;

the multiple-head tool is used for an operation of personalizing the cards;

the multiple-head tool includes a plurality of laser printing heads;

the multiple-head tool includes a plurality of inkjet printing heads;

the multiple-head tool includes a plurality of punching heads;

all the heads of the tool effect the same operation at the same time;

the heads of the multiple-head tool have variable gaps between them corresponding to different card formats.

Figure 6:
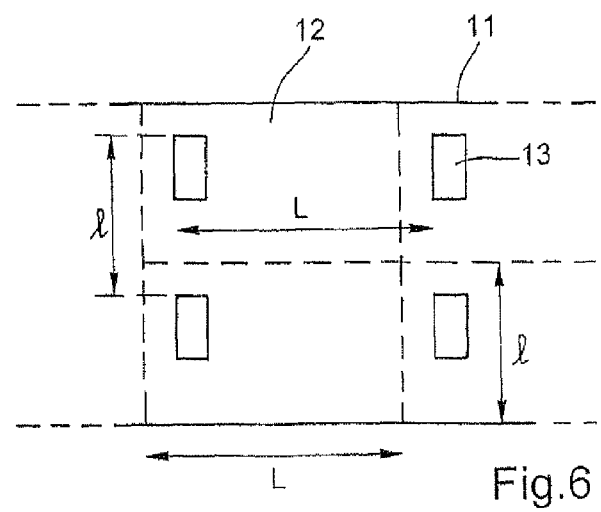
Figure 7:
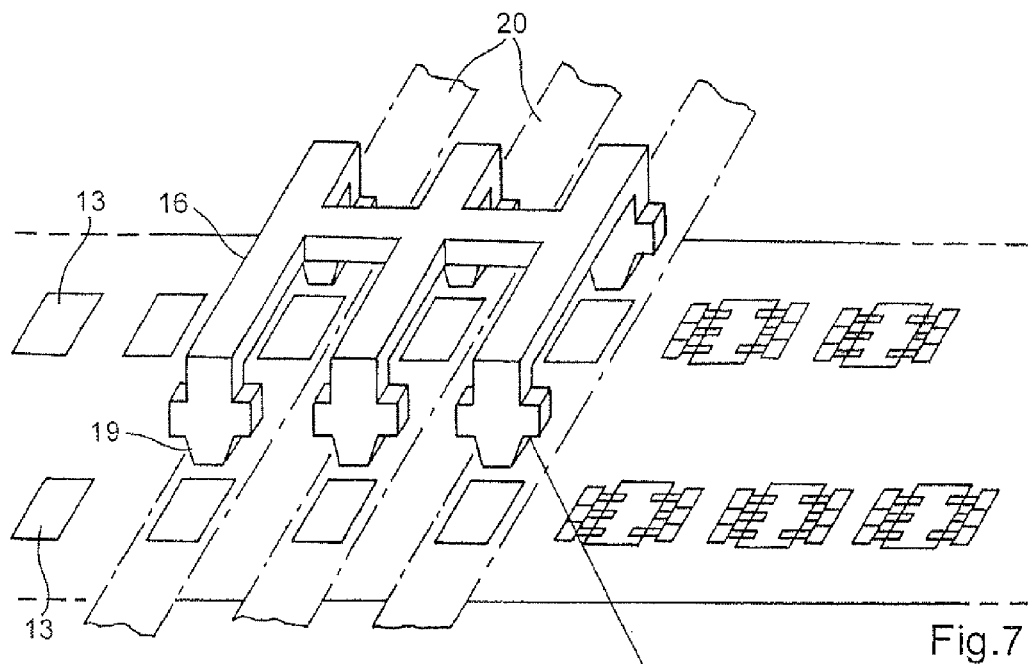
Figure 8:
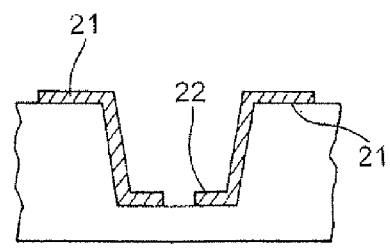
Figure 9:
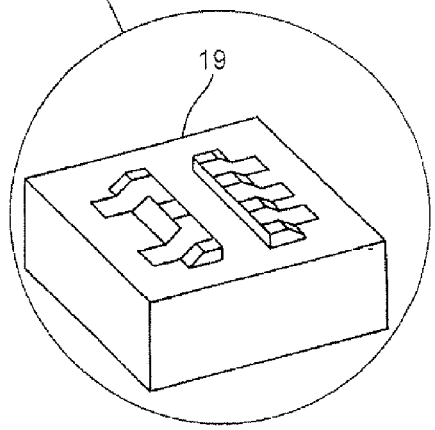
Figure 10:
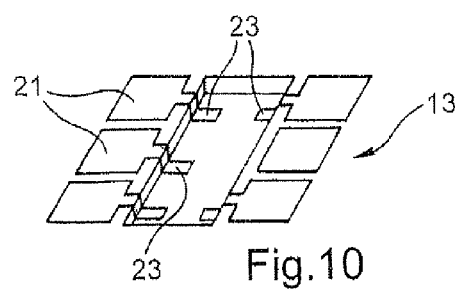
Figure 11:
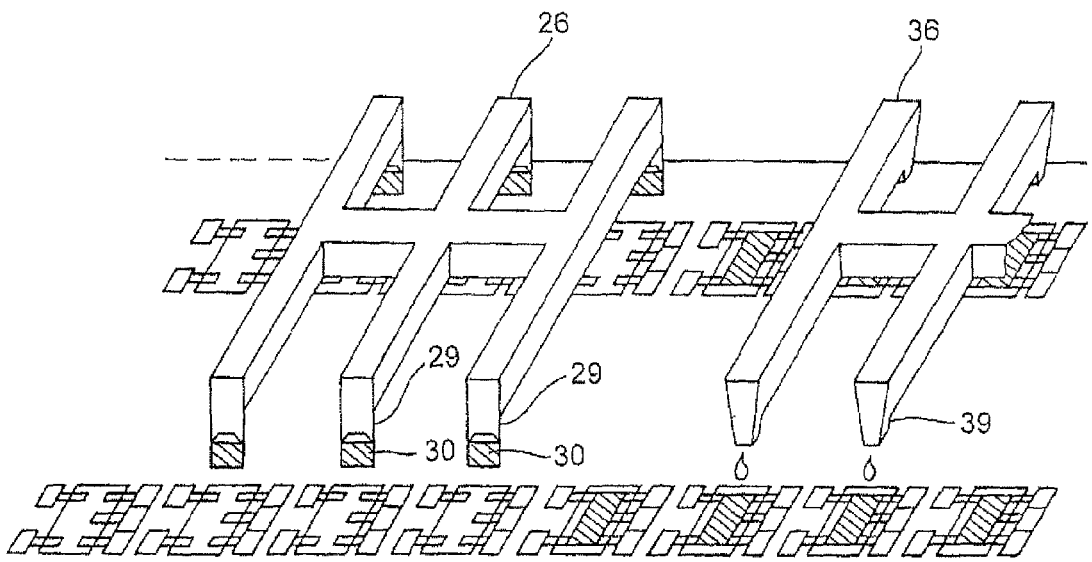
Figure 12:
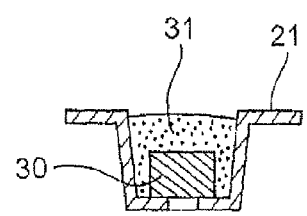
Figure 13:
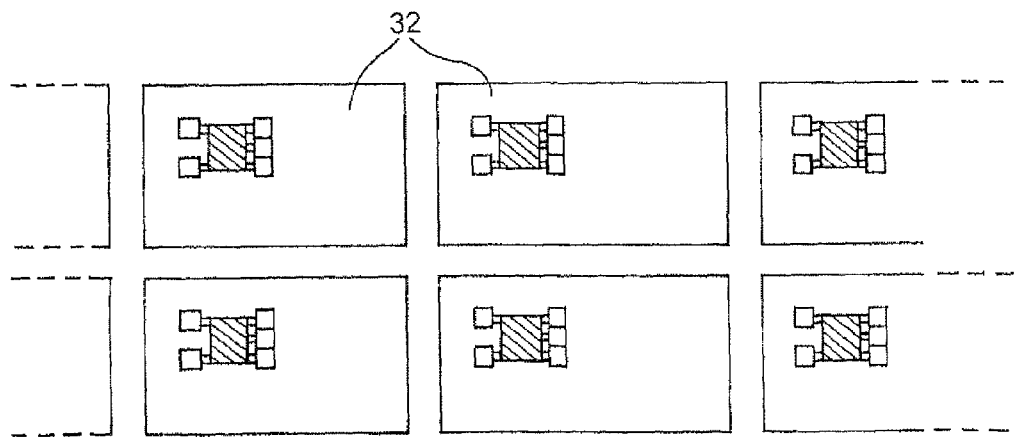
Figure 14:
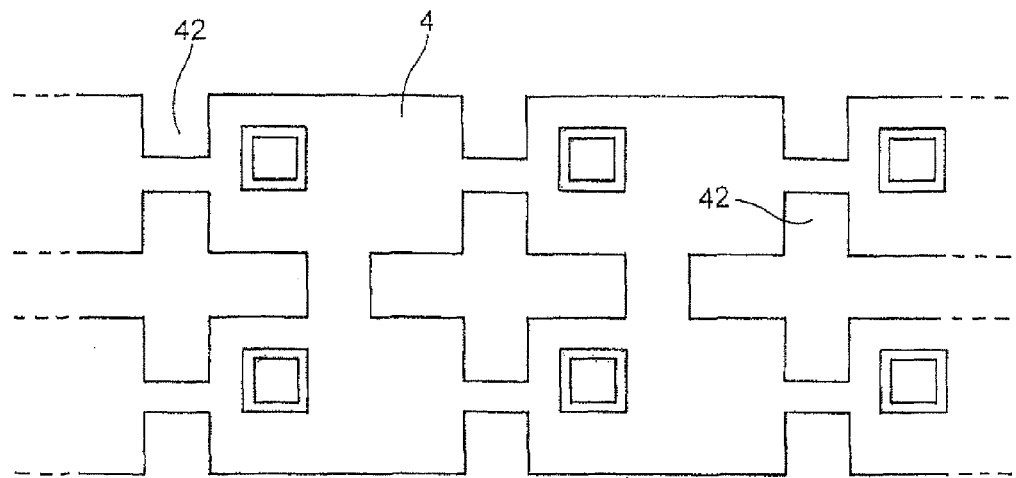
Figure 15:
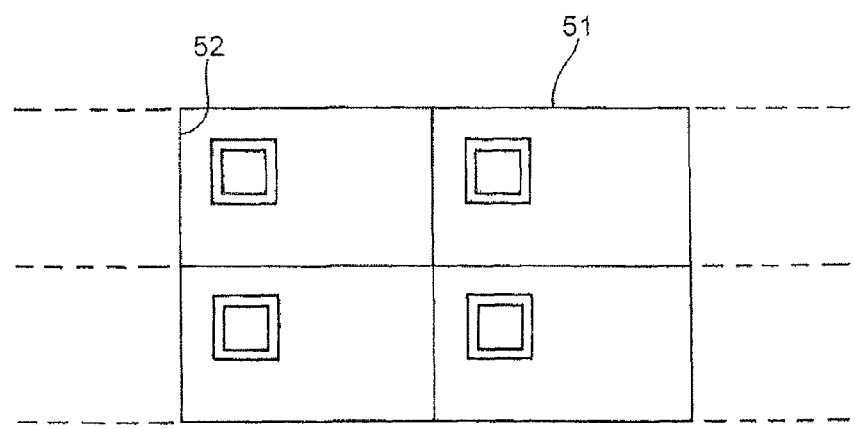
Figure 16:
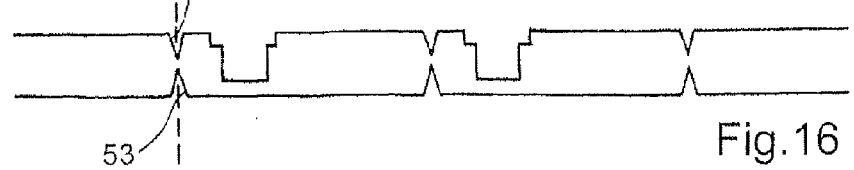
Figure 17:
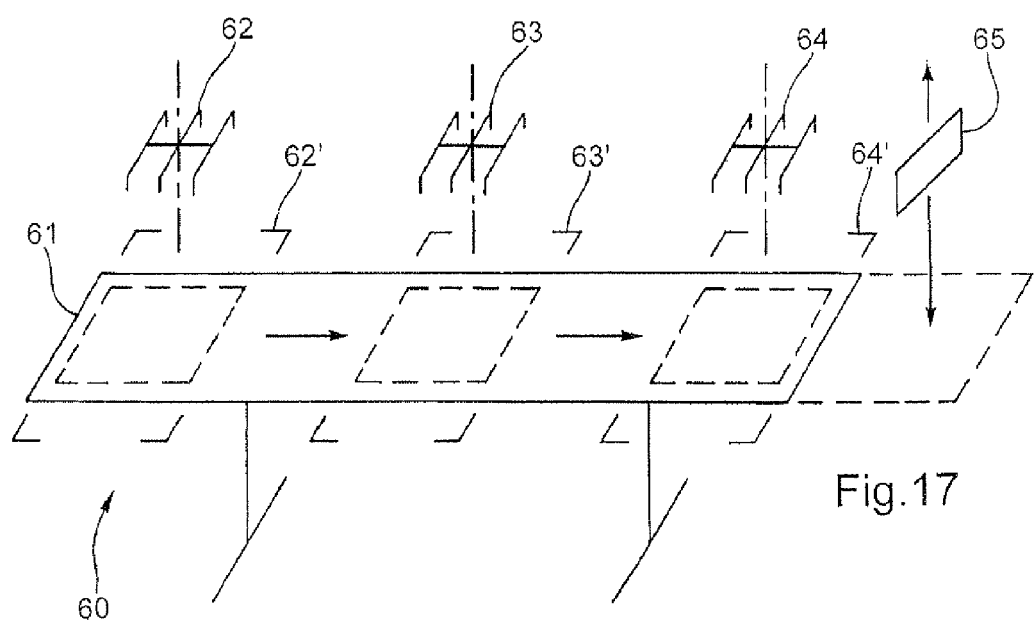

Objects, features and advantages of the invention emerge from the following description, given by way of illustrative and nonlimiting example, with reference to the appended drawings, in which:

FIG. 1 is a plan view of a support film in which cavities intended to receive an electronic module including a microcircuit have been formed with a view to forming microcircuit cards, FIG. 2 is a partial view in section of this film at the location of one of the cavities, FIG. 3 is a perspective view of the support film during embedding step accomplished simultaneously on several cavities, by means of a multiple head machine, FIG. 4 is a partial view in section of this film at the location of a cavity in which a module has been placed, FIG. 5 is a view of the film from FIGS. 1 and 3 after separation of the cards, FIG. 6 is a view analogous to that of FIG. 1, showing another support film provided with cavities having a different geometry, FIG. 7 is a perspective view of the support film from FIG. 6 during an operation, forming part of an embedding step, accomplished simultaneously on several cavities, by means of another multiple-head tool, FIG. 8 is a view in section of a cavity of the film from FIG. 7, FIG. 9 is a bottom perspective view of a head of the tool from FIG. 7, FIG. 10 is a perspective view of the cavity from FIG. 8 after the operation carried out by the head from FIG. 9, FIG. 11 is a perspective view of the same support sheet during a later operation forming part of the embedding step, accomplished simultaneously on several cavities, by means of a further multiple-head tool, FIG. 12 is a view in section of a cavity after carrying out this other operation of the embedding step, FIG. 13 is a view of the film from FIG. 11 after separating the chip cards, FIG. 14 is a view of a further support film, having slots between the locations of the future chip cards, FIG. 15 is a view of a further support film, having scorelines between the locations of the future chip cards, FIG. 16 is a view of that film in section, and FIG. 17 is a theoretical diagram of a machine adapted to execute the invention A card according to the invention has a body made from a material that can be molded, preferably a plastic material of any appropriate type known in the art.

This card can be a memory card such as an SD card or a Smartmedia card. It is preferably a card conforming to the ISO 7816 standard, i.e. an ID-000 type card.

The card thickness is immaterial. It can be a card approximately 0.76 mm thick, as is the case for a microchip card, or thicker. The thickness is immaterial as far as the invention is concerned.

As for the width and the length of the card, they are preferably less than those defined by the ID-1 format, defined in the ISO 7816 standard. They are preferably equal to, or even less than, those defined by the ID-000 format. The card can be a Mini-UICC format card, for example. The invention is of particular benefit in the case of cards of small size (ID-000, mini-UICC).

As is known in the art, the card includes a cavity in which the microcircuit is inserted; this microcircuit can be fixed to a printed circuit to form a module before being inserted into the cavity and fixed to the card support. Alternatively, the microcircuit is fixed directly to the bottom of the cavity.

A card according to the invention can have exterior electrical contacts (contact cards, or even hybrid or dual cards) or not (contactless cards).

The microcircuit is preferably a microcontroller able to interact with a reader conforming to the ISO 7816 standard. Alternatively, it can be a flash memory, a fingerprint sensor, a screen, a solar sensor, etc. It should be noted that the card does not necessarily include any input/output port of the contact or antenna type; thus the card can have, by way of interface with the exterior, only a sensor, for example a fingerprint sensor, and a screen.

If a module is integrated into the cavity, that module can of course include a plurality of microcircuits.

In one embodiment of the invention, the fabrication of such chip cards includes:

- a step of preparation of a support film made from one or more plastic materials and including a plurality of card locations each of which is intended to constitute a card support,
- a step of processing said plastic film carried out by means of a multiple-head tool, each of the heads performing said step of processing a different card location substantially in parallel with the processing performed by at least one other head, and
- a subsequent step of separating the locations.

Clearly this method has the advantage that processing is no longer sequential, but parallel. This increases the throughput of the embedding and personalizing machines in terms of the number of cards processed. Furthermore, this yields a machine that can be adapted to different card sizes and shapes, because it suffices to change the multiple-head tool matrix to adapt to a new card shape.

The method preferably includes a molding step to form said plastic film. Using such molding (in practice injection molding) avoids or facilitates a certain number of processes, in particular hollowing out the cavity or precutting the card supports.

The molding step forms the cavities directly: there is no longer any need to provide a step of removing material.

Furthermore, molding can provide slots on a portion of the periphery of the locations or scorelines in the thickness along that periphery to produce precut card supports. A benefit of forming slots or scorelines at the molding stage is that final separation, where applicable manual separation, is facilitated.

Any other support film preparation technique can be used, however. Thus a film of this kind can be produced by laminating diverse films having different functions, and then hollowing out cavities at each of the locations.

Said cards advantageously have a length and a width substantially less than those of a card to the ID-1 format.

FIG. 1 represents a portion of a support film 1 in which a plurality of card locations 2 are identified; here there is an array of two rows side by side; clearly it could instead be a long strip. In each of the locations there is a cavity 3 (produced during molding) which, in the FIG. 2 example, has a lip 4 near the upper surface. Each cavity is separated from the adjacent cavities by a gap at least equal to, and preferably greater than, the dimensions of the locations 2. Accordingly, in the example shown, the locations are exactly adjacent so that the gap between the cavities is equal to the length L or the width l of the locations.

The molding material injection points are in practice situated on the edge of the film to prevent the presence of visual defects on the surface of the film and therefore on the surface of the future cards (see the document FR-2 778 002 in the case of individual cards). However, in an embodiment that is not shown, if the gap between the cavities is greater than the dimensions of the locations, which means that the locations are not adjacent, the injection points are advantageously disposed on a face of the film, between the locations.

The film 1 as a whole is manipulated by indexing and positioning members shown diagrammatically by blocks 5, enabling the use of a compact machine and compact tools. Thus FIG. 3 shows a multiple-head tool 6 adapted to carry out a simultaneous embedding step on a large number of card locations, here six locations. Alternatively, this tool is adapted to participate in the electrical test operation (to verify correct connection of the microcircuit after embedding).

Clearly, the gap between the cavities in both directions (longitudinal and transverse) being constant (because they are defined by the identification of the locations on the sheet (which is indeformable in these directions)), the distance between the heads can also be constant, which contributes to the compactness of the multiple-head tool and therefore to its simplicity. This compactness and this simplicity of the tool are increased by the small value of this step. Combined with the simplicity and compactness of the film indexing and positioning system, this contributes to minimizing the cost of the machine as a whole for implementing the method.

To be more precise, movement of the tool 6 is driven by a manipulator arm 7 having at least one degree of freedom for movement in vertical translation.

This tool includes a set of fingers 8 each adapted to grasp, for example by suction, a module 9 previously assembled by any appropriate known method and stored temporarily in a waiting area, not shown, the manipulator arm being able to circulate between this waiting area and the processing area in which the film 1 is located. In practice these electronic modules are produced in a strip and are cut from the strip shortly before embedding.

FIG. 3 shows that the cavities on the right-hand side of the tool 6 already include a module while the cavities on the left are awaiting embedding. Under the tool 6 are six cavities about to receive, simultaneously, modules carried by the fingers of this tool.

It is merely to clarify FIG. 3 that the cavities are closer together than in FIG. 2; this makes it possible to represent filled cavities, cavities being processed and cavities to be processed on a subsequent cycle of use of the tool shown.

Note from FIG. 3 that these modules 9 are of the type carrying external contacts, so that no connection has to be provided between these modules and other card components.

FIG. 4 shows this kind of module after embedding in a cavity: the module is fixed to the cavity by means of an adhesive 10 situated between the periphery of the module and the lip 4 of the cavity. Here the adhesive 10 is a hot-melt adhesive advantageously deposited beforehand on the strip from which the modules are taken; this adhesive can instead be of any other appropriate type; it can also be a glue, for example a cyanoacrylate glue deposited by another multiple-head tool on the lip of the cavities.

As is known in the art, this module includes the microcircuit mounted on its face that faces toward the bottom of the cavity, within a mass 11 of protective resin. Alternatively, a drop of resin could be deposited in the cavity before placing the module therein, the microcircuit possibly being mounted on the module without being encapsulated, encapsulation occurring upon forced introduction of the microcircuit into the droplet of resin, as a consequence of which the microcircuit is fixed to the bottom of the cavity, which helps to guarantee that an attempt to pull the module out of the cavity significantly damages the module (see the documents EP-0 519 564 and FR-2 793 330).

If necessary, other multiple-head tools can be used to carry out other operations, for example an electrical test to verify the integrity of the module after embedding it.

It is after this that the locations identified on the sheet are separated to yield individual operational cards.

Embedding and simultaneous testing of a number of cards at a time has been proved to result in embedding cost savings of the order of 40% compared to current techniques of individual and sequential processing.

Injection molding the support sheets in accordance with the invention enables the use of very high throughput embedding equipment (up to 5 000 or even 10 000 items per hour).

It is clear that the invention can be used to assemble cards of various formats, without necessitating in-depth modifications of the machine employed, in particular with regard to the embedding product circulation circuits. This enables different cards to be processed on the same machine, and the technology of the invention can therefore be referred to as a multi-standard technology.

If cards to a given format are processed sequentially and individually, the card indexing system (positioning of each card relative to the various single-head tools, or even movement) depends closely on the shape of these cards. It follows that if the size or the shape of the cards to be fabricated is changed, the whole machine must be adapted (assuming that is possible); the possible magnitude of this task is one of the reasons why the ID-1 format is currently used as an intermediary stage for the production of smaller cards.

In contrast, the invention facilitates changing the format or size because, if the format of the films does not change (or change much), it suffices to change the geometry of the multiple-head tools, without changing machine. A tool with the heads at a variable distance suffices for this (as shown by the arrows in FIG. 3).

The fact that molding integrates the formation of scorelines or slots between the locations means that the final separation of the locations after embedding can be effected simply, where applicable independent of the format or the shape of the locations, for example manually; it is therefore not necessary to provide cutting equipment designed as a function of this shape or this size.

FIG. 5 represents a plurality of chip cards obtained after separation of the locations provided on the film 1. This separation can be effected by means of a part-carrier matrix. Once again, cutting numerous small cards from the sheet achieves very high throughputs (of the aforementioned order of 10 000 parts per hour).

This separation step can follow embedding at any time of course. Thus, as indicated hereinabove, there can be a step of simultaneously testing the embedded modules before proceeding to the separation step. Alternatively, this testing step is effected on each individual card after a separation step of this kind. That separation step can equally be effected after the operations of electrical and/or graphical personalization of the cards, i.e. this separation step can occur right at the end of the card fabrication process. Clearly, after using a multiple-head embedding tool, a multiple-head tool can be used for the electrical testing of the embedded modules, and a multiple-head tool for personalizing the cards. It is clear that the invention thus avoids the use of complex systems such as drums receiving batches of cards already separated from other cards or bulky systems for carrying out these operations following on from embedding as such.

The operator can choose whether to effect graphical personalization by means of a plurality of laser heads or inkjet heads, or even by means of a plurality of punches, those heads or punches being carried by the same tool and having the same downward movement imparted to them.

As for personalization, it can be effected by a plurality of heads capable of communicating with the microcircuits of a plurality of future cards, by means of external connection areas provided on the module, or even on the surface of the card near its cavity (see below).

Alternatively, this personalization is effected simultaneously by means of a plurality of heads, by electromagnetic communication with an antenna provided in each card.

FIGS. 6 to 13 show another embedding step, several elementary operations of which are carried out by means of appropriate multiple-head tools. Certain details are inspired by the teachings of the documents FR-2 777 675 and EP-0 908 844.

Thus FIG. 6 shows a support film 11 obtained by injection molding and featuring multiple cavities 13 resulting from this molding step within a plurality of identified locations 12 the boundaries whereof are schematically indicated by dashed lines. Unlike the FIG. 1 cavities, the cavities 13 have no set back lips, but slightly inclined flanks 14 (inclined at 30° to 45° at most) as seen in FIG. 8. Here these cavities are rectangular.

FIG. 7 represents this film 11 undergoing an embedding operation carried out by a multiple-head tool 16 capable of effecting an elementary embossing operation forming part of a processing step, here an embedding step.

The embossing heads 19 mounted at the ends of the fingers 18 of the tool, one of which is represented in FIG. 9, each cut off a portion of a copper strip 20 unwound transversely above the cavities and stamp the pattern cut out in this way into the bottom, the sides and the exterior perimeter of the cavities, so as to create (see FIGS. 8 and 10) external contacts 21 (on the perimeter of the cavity) and internal contacts 22 (on the bottom of the cavity), these external and internal contacts being connected by tracks extending over flanks of this cavity.

Adhesion between the cut out copper pattern and the material of which the card support consists is provided either by a glue precoated onto the copper strip or by making the lower surface of the copper strip very rough to authorize mechanical attachment between the strip and the material of the card support.

The copper strip can be replaced by any other conductive material strip, of course. There can further be provision for a multiple-head tool to deposit a pattern in each cavity during a previous step, that pattern then being assembled to the surface of the cavity as indicated in FIG. 7.

Like that described with reference to FIGS. 1 to 5, this elementary embedding operation can be accomplished at very high frequencies, since it uses simple and compact embossing equipment.

FIG. 11 shows the execution of other elementary operations forming part of the embedding step begun in FIG. 7. These elementary steps correspond to the flip-chip mounting technique, i.e. to mounting microcircuits "upside-down".

A multiple-head tool 26 (on the left) includes a plurality of manipulation heads 29 adapted to deposit microcircuits 30 in the cavities. The positioning of the microcircuit and that of the internal contacts 22 are such that this connects each microcircuit to the associated external contacts. A subsequent operation is effected by a multiple-head coating tool 36, each head 39 whereof is adapted to fill each of the cavities in which conductive patterns have been embossed and where a microcircuit has been deposited. This filling or covering can be effected with a glue or with an encapsulating resin 31 (see FIG. 12) adapted to fix the microcircuit efficaciously to the bottom and to the flanks of the cavity concerned.

A gluing (deposition of glue) operation is advantageously carried out before depositing the microcircuit.

Clearly the tool 36 can instead be used to deposit resin on the bottom of the cavities before carrying out the operation described with reference to FIG. 3.

These elementary operations, here all carried out simultaneously on a plurality of cavities by means of multiple-head tools, are followed by a separation step that can be carried out in the same way as described with reference to FIG. 5; this produces individual cards 32.

Clearly this embedding step variant dispenses with the need to have a printed circuit forming a module with the microcircuit, which can significantly reduce costs relative to the embedding step of FIGS. 1 to 5.

Alternatively although this is not shown, the operations described with reference to FIGS. 3 and 7 can be combined to mount modules intended to be connected to an antenna previously integrated into the film, by injection molding or by any other technique, to form a contactless or hybrid card.

FIG. 14 represents another support film 41 that is distinguished from those of the previous figures by the fact that, instead of being adjacent, the locations corresponding to the future cards are separated with a gap determined by slots 42 that leave only a few bridges 43 to maintain the respective relative positions of the locations. Clearly final separation of the cards will simply necessitate breaking the bridges, which does not imply the use of complicated equipment.

FIGS. 15 and 16 represent a further support sheet 51 that is distinguished from those of FIGS. 1 to 13 by the fact that, although adjacent, the locations intended to form the future cards are determined by mechanically weakened boundaries, here weakened by two scorelines 52 and 53 in the thickness of the card support. As in FIG. 14, this simplifies the final separation of the cards and does not involve the use of a powerful tool.

These scorelines and slots can be combined, of course.

Furthermore, they can be provided regardless of the method of preparing the support films, for example by removing material or cutting.

In the examples of FIGS. 14 to 16, the cards can be separated by hand.

FIG. 17 is a theoretical diagram representing one example of a machine adapted to use the method of the invention.

The machine 60 includes a fixed worksurface 61 including three processing areas 62, 63 and 64, adapted for example to the elementary operations described with reference to FIGS. 7 and 11, each effected by means of a multiple-head tool like the tools 16, 26 and 36. Each of the processing areas is provided with a system 62', 63' or 64' for indexing and positioning a film (which can be the same size as the processing area).

These tools can be used for other operations, whether or not forming part of the embedding step. Accordingly, as indicated hereinabove, this kind of multiple-head tool can be designed (according to the same principle as the tool described hereinabove) to carry out electrical test operations or even personalization operations.

Clearly these operations are not limited to simple printing of graphics (which does not imply a multiple-head tool).

Also, it is not necessary for the various tools to have the same number of heads. Thus, for example, there can be more heads on a tool if the operation to be performed is simple (or the volume of the individual heads is small, etc.).

However, the multiple-head tools can have the same structure, so that it suffices to change heads for a given tool to change function.

There is advantageously a cutting out station 65 downstream of the processing operations carried out by the multiple-head tools, possibly itself provided with a multiple-head tool. However, the tool can simply be a cutting blade driven with an upward movement.

The passage from one area to another is provided by any transport means of any appropriate known type. Alternatively, the worksurface is moved so that a given film is brought to each multiple-head tool in succession. The tools can equally well move relative to the work surface (which can be continuous or not, and so on).

Clearly the invention produces small format cards quickly, with a throughput that is inversely proportional to the size of the format.

Remember that the invention is generalized to the case of support films made by a technique other than molding, such as laminating complementary films, in a manner known in the art.

Moreover, as described hereinabove, all the heads of the tool concerned affect the same operation at different locations, entirely simultaneously. However, the invention applies equally to the situation where only some of the heads carry out the same operation simultaneously, for example by providing an offset between the times at which, in the case of films carrying two cards side by side, the tool electrically tests the successive pairs of microcircuits after embedding, for example so as not to draw too much current at once.

The invention applies also to the case where a tool can include heads effecting a first operation and other heads effecting a second operation complementing the first, for example to deposit a drop of glue immediately before placing a module or a microcircuit.

The invention claimed is:

1. Method for producing a plurality of chip cards having a length and width equal to or smaller than those defined for the ID-000 format, the method comprising:
   preparing a support film including a plurality of locations each of which is intended to form, after separation, a chip card and is provided with a cavity adapted to receive a microcircuit, this step including an operation of molding the support film with said cavities together with slots between adjacent ones of the plurality of locations leaving slots or scorelines in a thickness of the support film;
   processing said support film carried out at least in part by means of a multiple head tool while indexing and positioning the support film, at least one of the heads of this tool being adapted to effect an operation on one location of the film substantially at the same time as another head of the multiple head tool is effecting the same operation on another location of the support film, wherein each of said heads is separated from an adjacent one of said heads by one of the slots or scorelines of the support film; and
   separating the locations after said processing step so as to form the chip cards, this step being facilitated by the slots or scorelines provided during the preparing step.

2. Method according to claim 1, wherein the multiple head tool is used for an operation of personalizing the cards.

3. Method according to claim 1, wherein all the heads of the multiple head tool effect the same operation at the same time.

4. Method for producing a plurality of chip cards, comprising:
   preparing a support film including a plurality of locations each of which is intended to constitute a card support and is provided with a cavity adapted to receive a microcircuit;
   processing the support film carried out at least in part by means of a multiple head tool, at least one of the heads of the multiple head tool being adapted to effect an operation on one location of the support film substantially at the same time as another head of the multiple head tool is effecting the same operation on another location of the support film; and
   separating the locations after said processing step,
   wherein the multiple head tool includes a plurality of laser printing heads.

5. Method according to claim 4, wherein the preparing step includes an operation of injection molding the support film with said cavities.

6. Method according to claim 4, wherein the preparing step includes an operation of forming slots between the locations leaving mechanical connection bridges to facilitate the subsequent separation operation.

7. Method according to claim 6, wherein the operation intended to facilitate the subsequent separation operation is carried out when molding the support.

8. Method according to claim 4, wherein the preparing step includes an operation of formation of scorelines in the thickness of the support film to facilitate a subsequent separation operation.

9. Method for producing a plurality of chip cards, comprising:
   preparing a support film including a plurality of locations each of which is intended to constitute a card support and is provided with a cavity adapted to receive a microcircuit;
   processing said support film carried out at least in part by means of a multiple head tool, at least one of the heads of the multiple head tool being adapted to effect an operation on one location of the support film substantially at the same time as another head of the multiple head tool is effecting the same operation on another location of the support film; and
   separating the locations after said processing step,
   wherein the heads of the multiple head tool have variable gaps between them corresponding to different card formats.

10. Machine for fabrication of chip cards having a length and width equal to or smaller than those defined for the ID-000 format, the machine comprising:
    a multiple head tool adapted to execute a same operation at several locations of a support film provided in an injection molding operation with cavities and with slots or scorelines, the support film forming, after separation, future chip cards having a length and width equal to or smaller than those defined by the ID-000 format,
    wherein plural heads of said multiple head tool are arranged so that when the same operation is being executed, each one of said plural heads is separated from an adjacent one of said plural heads by one of the slots or scorelines of the support film.

11. The machine according to claim 10, wherein the multiple-head tool is arranged to personalize the cards.

12. The machine according to claim 10, wherein the multiple-head tool includes a plurality of laser printing heads.

13. The machine according to claim 10, wherein all the heads of the multiple head tool execute the same operation at the same time.

14. The machine according to claim 10, wherein the heads of the multiple-head tool have variable gaps between them corresponding to different card formats.

* * * * *

UNITED STATES PATENT AND TRADEMARK OFFICE
CERTIFICATE OF CORRECTION

PATENT NO. : 8,561,291 B2  Page 1 of 1
APPLICATION NO. : 12/091904
DATED : October 22, 2013
INVENTOR(S) : Launay et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this
Fifteenth Day of September, 2015

Michelle K. Lee
*Director of the United States Patent and Trademark Office*